J. W. & H. HEGELER.
SYSTEM FOR UTILIZING WASTE HEAT FROM FURNACES FOR HEATING BOILERS.
APPLICATION FILED JAN. 25, 1912.
1,050,134.
Patented Jan. 14, 1913.
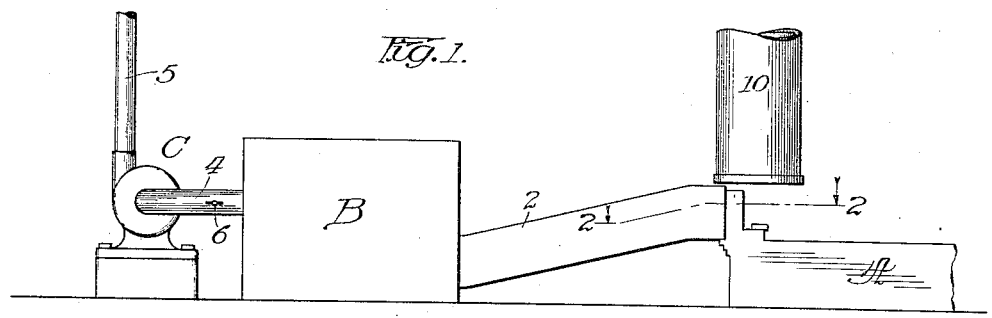
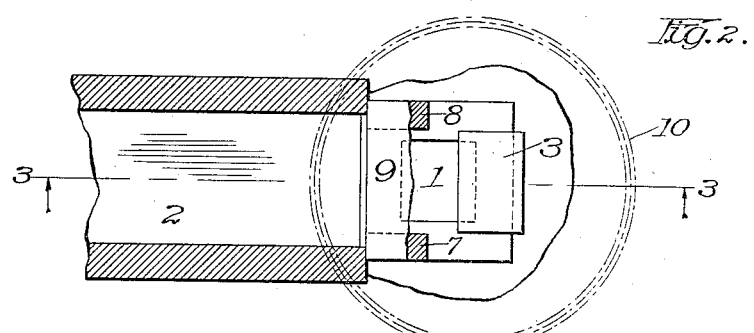
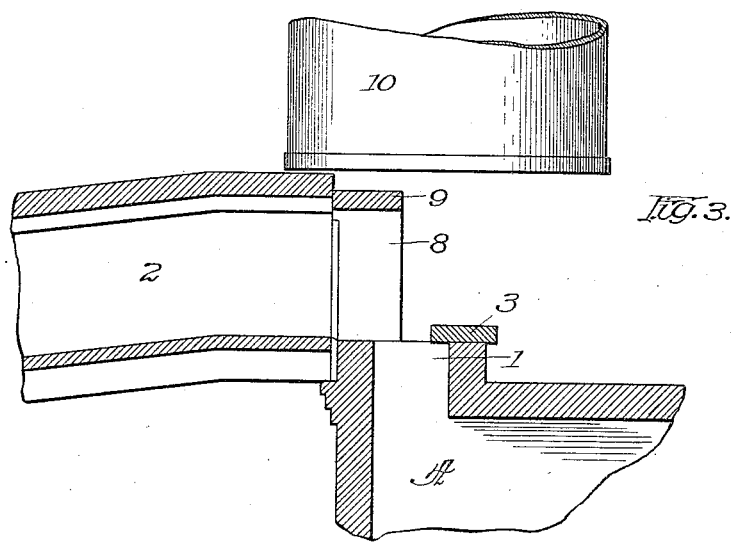

UNITED STATES PATENT OFFICE.

JULIUS W. HEGELER AND HERMAN HEGELER, OF DANVILLE, ILLINOIS.

SYSTEM FOR UTILIZING WASTE HEAT FROM FURNACES FOR HEATING BOILERS.

1,050,134. Specification of Letters Patent. Patented Jan. 14, 1913.

Application filed January 25, 1912. Serial No. 673,428.

*To all whom it may concern:*

Be it known that we, JULIUS W. HEGELER and HERMAN HEGELER, both citizens of the United States, and residents of Danville, in the county of Vermilion and State of Illinois, have invented a new and useful System for Utilizing Waste Heat from Furnaces for Heating Boilers, of which the following is a specification.

This invention relates to a system for heating boilers by waste heat from furnaces, as ore smelting and roasting furnaces or the like.

The object of our invention is to provide a system of flues and dampers for both said furnace and boiler, and including a pipe or flue connecting the furnace discharge flue with the boiler, so constructed and arranged that both said furnace and boiler may be controlled and regulated independently of each other and without one affecting the operation of the other.

To accomplish this object, our invention consists in providing the furnace with a flue which opens directly into the air and in connecting the fire box of the boiler with said furnace discharge flue by means of a pipe or flue, the admission end of which is located in close proximity to the discharge end of the furnace discharge flue, and in providing an induced draft for the boiler, preferably by means of a fan or blower applied at the discharge end of the boiler, which will operate to draw the heated waste gases from the furnace discharge flue into the flue leading to the boiler and thence into and through the boiler and blower, whence it escapes into the stack of the boiler.

Preferably, also, our invention comprises means for adjusting the operative size of the furnace discharge flue, desirable means for this purpose consisting of a damper plate made of suitable refractory material slidably mounted over the discharge end of said furnace discharge flue below the open end of the pipe or flue leading to the boiler, and a damper being provided, preferably in the suction pipe of the blower, for regulating the draft of the boiler. Also, to prevent cold atmosphere air from being drawn into the boiler supply pipe or flue, the admission end thereof is surrounded by a hood, comprising sides which form extensions of the side walls of the furnace discharge flue and a top wall or baffle plate which extends partly across the furnace discharge flue.

In the accompanying drawing in which our invention is fully illustrated,—Figure 1 is a diagrammatic side elevation of a furnace and boiler connected and equipped for heating the boiler in accordance with our improved system. Fig. 2 is an enlarged fragmentary plan section on the line 2—2 of Fig. 1; and Fig. 3 is a vertical section on the line 3—3 of Fig. 2.

Referring now to the drawings, A and B represent, respectively, a furnace, as an ore distilling or roasting furnace, and a boiler, both of which may be of any usual or desired construction.

The furnace A is provided with a flue 1 for the escape of the waste gases and the waste heat escaping from said furnace is adapted to be delivered to the fire box of the boiler through a pipe or flue 2, the admission end of which is positioned just above and to one side of the discharge end of the furnace discharge flue 1.

In order to secure economical and effective operation of the furnace under different conditions, means are preferably provided for varying the operative size of the furnace discharge flue 1. Desirable means for this purpose consists of a damper plate 3, made of suitable refractory material, as fire clay, slidably mounted at the discharge end of the furnace discharge flue and adapted to be moved so as to provide a larger or smaller discharge opening for the escape of the heated waste gases from the furnace, as may be desired.

To insure a supply of heat to the boiler, regardless of the adjustment of the damper plate 3 or the conditions under which the furnace is being operated, the boiler B is provided with an induced draft, produced, as shown, by means of a fan or blower C the suction pipe 4 of which communicates directly with the smoke stack opening of said boiler and which discharges directly into the stack 5. Our invention, however, contemplates the use of any desired or approved means for inducing a draft in the boiler, as a smoke stack of suitable height. The suction of the fan or blower C, or its equivalent, will operate, in an obvious manner, to draw the heated waste gases escaping from the furnace discharge flue 1 into the boiler supply pipe or flue 2 and the quantity of heat supplied to the boiler will depend upon the strength of such suction. Thus, by providing means for varying the operative suction of said fan or blower in the boiler supply pipe or flue 2, the supply of heat furnished to the boiler may be easily regulated. Convenient means for thus regulating the suction of said fan C consists of a damper 6 in the suction pipe 4 of the blower.

In order to render the operation of the suction fan C more effective and to prevent cold atmosphere air from being drawn into the boiler supply pipe, the admission end of said boiler supply pipe is preferably surrounded by a hood, consisting, as shown, of side walls 7 and 8, which form upward extensions of the walls of the furnace discharge flue, and a top side 9 located just above the admission opening to said boiler supply pipe and which extends partly over the discharge end of the furnace discharge flue. Said hood will operate to prevent air from being drawn into the boiler supply pipe, while the top side 9 thereof will form, in effect, a baffle plate which will tend to deflect the heated waste gases escaping from the furnace discharge flue into the boiler supply pipe.

To provide for carrying off the waste gases from the furnace discharge flue 1, which do not pass into the boiler supply pipe or flue 2, a stack 10 is preferably provided, located directly above the furnace discharge flue 1, the lower end of said stack being spaced a short distance from the upper end of said furnace discharge flue, whereby the suction due to said stack will not affect the operation and control of the furnace and boiler as heretofore described. With the described construction, it is obvious that both said furnace and boiler may be controlled and regulated independently of and without in any way affecting each other, in the manner desired.

We claim:

1. A system for heating boilers by waste heat from furnaces, comprising a discharge flue from the furnace which opens directly into the air, a separate supply pipe to the boiler, the admission end of which is located in close proximity to the discharge end of said furnace discharge flue, means for inducing a draft in the boiler and means for regulating said draft, substantially as described.

2. A system for heating boilers by waste heat from furnaces, comprising a discharge flue from the furnace which opens directly into the air, a separate supply pipe to the boiler, the admission end of which is located in close proximity to the discharge end of said furnace discharge flue, means for varying the operative size of said furnace discharge flue, means for inducing a draft in the boiler and means for regulating said draft, substantially as described.

3. A system for heating boilers by waste heat from furnaces, comprising a discharge flue from the furnace which opens directly into the air, a separate supply pipe to the boiler, the admission end of which is located in close proximity to the discharge end of said furnace discharge flue, a fan or blower for inducing a draft in the boiler and a damper for regulating the operative suction of said fan or blower, substantially as described.

4. A system for heating boilers by waste heat from furnaces, comprising a discharge flue from the furnace which opens directly into the air, a separate supply pipe to the boiler, the admission end of which is located in close proximity to the discharge end of the furnace discharge flue, means for inducing a draft in the boiler, means for regulating the operative force of said draft, and a hood which surrounds the admission end of said boiler supply pipe, substantially as described.

5. A system for heating boilers by waste heat from furnaces, comprising a discharge flue from the furnace which opens directly into the air, means for varying the operative side of said furnace discharge flue, a separate supply pipe to the boiler, the admission end of which is located in close proximity to the discharge end of the furnace discharge flue, means for inducing a draft in the boiler, means for regulating said draft, and a hood which surrounds the admission end of said boiler supply pipe, substantially as described.

In testimony, that we claim the foregoing as our invention, we affix our signatures in presence of two subscribing witnesses, this 17" day of January A. D. 1912.

JULIUS W. HEGELER.
HERMAN HEGELER.

Witnesses:
J. R. GANO,
W. O. BRYDEN.

Copies of this patent may be obtained for five cents each, by addressing the "Commissioner of Patents, Washington, D. C."